United States Patent [19]

Nagano

[11] 4,038,952
[45] Aug. 2, 1977

[54] INTERNAL COMBUSTION ENGINE

[75] Inventor: Tetsuro Nagano, Shizuoka, Japan

[73] Assignee: Toyota Jidosha Kogyo Kabushiki Kaisha, Aichi, Japan

[21] Appl. No.: 559,793

[22] Filed: Mar. 19, 1975

[30] Foreign Application Priority Data

Aug. 8, 1974 Japan .................. 49-90998

[51] Int. Cl.² .......................................... F02B 23/00
[52] U.S. Cl. .................. 123/32 K; 123/32 SP; 123/191 SP
[58] Field of Search .......... 123/32 ST, 32 SP, 191 S, 123/191 SP, 32 SA, 30 C, 30 D, 32 K, 32 C

[56] References Cited

U.S. PATENT DOCUMENTS

| | | | |
|---|---|---|---|
| 2,735,413 | 2/1956 | Meyer et al. | 123/32 SP |
| 2,753,852 | 7/1956 | Beller | 123/30 D |
| 2,753,852 | 7/1956 | Beller | 123/32 SP |
| 2,758,576 | 8/1956 | Schlamann | 123/32 SP |
| 2,878,299 | 3/1959 | Starr | 123/32 SP |
| 2,893,360 | 7/1959 | Moller | 123/32 SP |
| 2,902,011 | 9/1959 | Hoffmann | 123/30 D |
| 3,063,434 | 11/1962 | Haas | 123/32 SP |
| 3,102,521 | 9/1963 | Slemmons | 123/32 SP |
| 3,113,561 | 12/1963 | Heintz | 123/32 SP |
| 3,127,878 | 4/1964 | Levnig et al. | 123/30 C |
| 3,154,058 | 10/1964 | Warren | 123/32 SP |
| 3,508,530 | 4/1970 | Clawson | 123/32 SP |
| 3,738,333 | 6/1973 | Vogelsang | 123/32 SP |
| 3,776,212 | 12/1973 | Karlowitz | 123/191 SP |
| 3,799,140 | 3/1974 | Vogelsang et al. | 123/32 SP |
| 3,875,909 | 4/1975 | May | 123/191 S |
| 3,890,942 | 6/1975 | Date et al. | 123/191 SP |

Primary Examiner—Carroll B. Dority, Jr.
Assistant Examiner—David D. Reynolds
Attorney, Agent, or Firm—Stevens, Davis, Miller & Mosher

[57] ABSTRACT

An internal combustion engine utilizing a combustion process of the stratified charge type, and having an auxiliary combustion chamber formed in a cylinder head portion in addition to a main combustion chamber, a passage communicating the auxiliary combustion chamber with the main combustion chamber and being provided with an ignition plug and a fuel injection nozzle for the auxiliary combustion chamber. This passage has a cross-section of a flat envelope, has a predetermined cross-sectional area relative to the transverse cross-sectional area of the piston, is inclined at an acute angle to the upper surface of the piston head, and extends tangentially to the auxiliary combustion chamber. The ignition plug is located upstream of the swirl in the auxiliary combustion chamber in relation to the fuel injection nozzle.

1 Claim, 4 Drawing Figures

INTERNAL COMBUSTION ENGINE

BACKGROUND OF THE INVENTION

1. Field of the Invention

This invention relates to an internal combustion engine provide with an auxiliary combustion chamber in addition to a main combustion chamber, and more particularly to an engine having an auxiliary combustion chamber and a gasoline injection nozzle for use in a motor vehicle, which engine is designed to improve fuel consumption and purification of exhaust gases.

2. Description of the Prior Art

Hitherto, for stratifying a fuel-air mixture charge in a gasoline internal combustion engine, it is a common practice to inject the fuel into a single combustion chamber or to provide main and auxiliary combustion chambers and to separately supply the fuel therein through two fuel supply systems.

According to the former system, i.e., a single combustion chamber system, in which fuel is to be injected, a swirl flow of fuel-air mixture is developed within a cylinder volume by means of a shroud valve or a piston with a cup to achieve a stratified charge of the mixture. However, the former system is confronted by a difficulty in achieving a strong swirl throughout the entire operational modes consistently.

In contrast thereto, according to the latter systems, i.e., in an engine having an auxiliary combustion chamber, fuel is injected into the auxiliary combustion chamber located separately from the main combustion chamber, in which a rich mixture charge is supplied to the auxiliary combustion chamber as well as a lean mixture to the main combustion chamber due to the escaping of part of fuel through the auxiliary combustion chamber into the main combustion chamber or to other fuel supplying system, so that the so-called stratified charges of fuel-air mixture may be achieved for two-stage combustions. In this case, the production of NOx of detrimental components contained in exhaust gases may be suppressed. However, because of the rich mixture charge in the auxiliary combustion chamber, there would be a tendency of increasing unfavorable amounts of emissions such as hydrocarbons and carbon monoxide.

For achieving stratification of the mixture charge in a gasoline engine having a carburetor, the fuel supply system should be divided into two system one of which is to accommodate the supply of a rich mixture charge having good ignitability and the other of which is to supply a great amount of lean mixture charge which is burnt due to a flame injected through the passage from the auxiliary combustion chamber. In this case, for insuring the achievement of a rich mixture charge there has been proposed a small sized auxiliary valve for introducing the rich mixture into the auxiliary combustion chamber. However, this complicates the fuel supply system as well as the valve system. The reduction in volume of the auxiliary combustion chamber results in the similarity in construction of conventional engines having a carburetor, so that difficulties will be experienced with engine running when using a lean mixture charge. In general, for reducing tha amount of NOx in exhaust gases from a gasoline engine with a carburetor, i.e., it is imperative to use an over-rich or over-lean mixture charge. Further in general, the gasoline engine with a carburetor dictates the use of the air-fuel ratio range of 11 to 20 for its satisfactory running. Thus, the use of over-rich mixture charge results in the increase of HC and CO together with the increase in fuel consumption, while the use of over-lean mixture charge leads to the occurrence of mis-fire, thus resulting in the increase in the amount of HC in exhaust gases.

With the stratified charge type combustion process, as used in the internal combustion engine according to the present invention, the combustion chamber is divided into a main combustion chamber and an auxiliary combustion chamber, wherein the main combustion chamber is communicated through a communicating passage with the auxiliary combustion chamber. In addition, the auxiliary combustion chamber is provided with an ignition plug, a fuel injection valve or a fuel injection nozzle, whereby the rich mixture charge is ignited in the auxiliary combustion chamber and then the flame thus produced is introduced into the main combustion chamber for the ensuing combustion of the lean mixture charge therein. In this case, air is supplied through the main combustion chamber into the auxiliary combustion chamber for stratification of mixture charge, with a minimum adverse affect by the trottling action due to the passage, and the flame is uniformly diffused throughout the main combustion chamber to effect the secondary combustion therein.

SUMMARY OF THE INVENTION

It is accordingly an object of the present invention to provide an internal combustion engine having an auxiliary combustion chamber, which reduces the amount of not only NOx but also HC and CO in exhaust gases.

It is another object of the present invention to provide an internal combustion engine having an auxiliary combustion chamber, which improves fuel comsumption.

It is another object of the present invention to provide an internal combustion engine having an auxiliary combustion chamber, which affords improvements in the purification of exhaust gases and fuel consumption, and is simple in construction.

According to the present invention, there is provided with an internal combustion engine comprising a main combustion chamber defined by a piston head, which is reciprocably disposed in a cylinder bore, an inner surface of the cylinder bore, to which air only is directly supplied and the under surface of the cylinder head; an auxiliary combustion chamber defined in the cylinder head above the main combustion chamber and provide with an ignition plug and a fuel injection nozzle; and a passage communicating the main combustion chamber with the auxiliary combustion chamber; the ignition plug being located upstream of the swirl in relation to the fuel ignition nozzle, the passage having a cross section of a flat envelope elongated in a direction parallel to the upper surface of the piston head, having a predetermined cross-sectional area relative to the transverse cross-sectional area of the piston head, and having an axial line extending tangentially to the auxiliary combustion chamber and at a small angle to the top surface of the piston head.

In the present invention, the combustion gas generated in the auxiliary combustion chamber is dispersed into the air in the main combustion chamber, therein the unburned components of the fuel and CO, HC gases are burned by secondary combustion, so that the amount of CO and HC in the exhaust gas can be considerably reduced.

DESCRIPTION OF THE PREFERRED EMBODIMENTS

Figure 1:
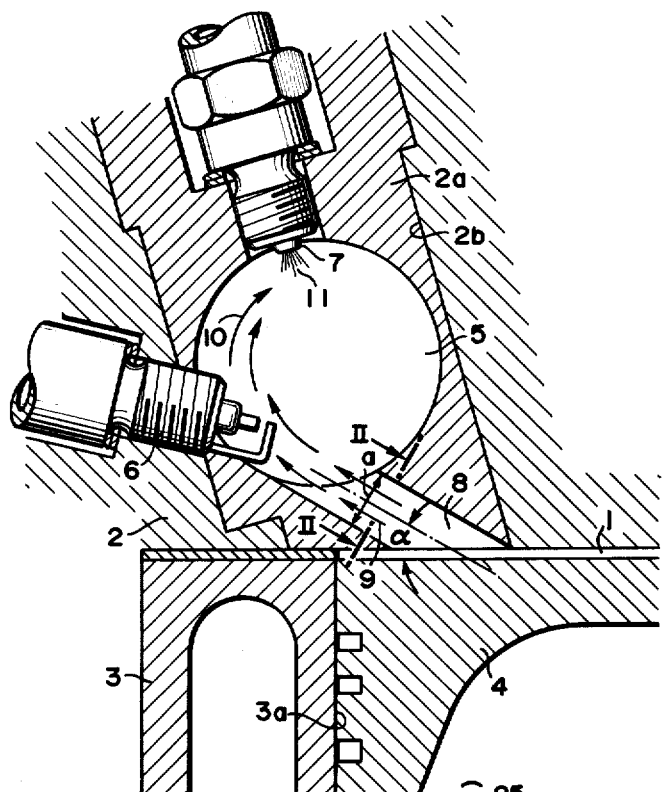
FIG. 1 is a cross sectional view showing an auxiliary combustion chamber and the parts associated therewith, of the gasoline injection type engine having the auxiliary combustion chamber.
Figure 2:
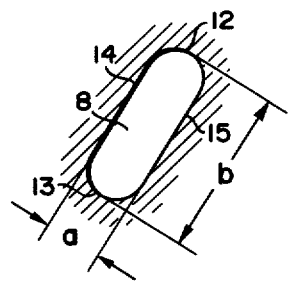
FIG. 2 is a cross sectional view showing the transfer passge, taken along the line II—II of FIG. 1.

Referring to FIG. 1, a main combustion chamber 1 is defined by the inner surface of a cylinder bore 3a of a cylinder block 3, a piston head 4 and the under surface of a cylinder head 2. In the drawing, only one cylinder of a fourcycle engine construction is illustrated. The cylinder head 2 is rigidly secured to the cylinder block 3 by means of conventional means, such as bolts and the like in usual manner. The piston head 4 is adapted to reciprocate vertically in the cylinder bore 3a and is connected to an engine crankshaft (not shown) by any usual suitable means. Provided in the cylinder head 2 is an air intake port (not shown) adapted to be opened or closed by means of an air intake valve (not shown) as in a conventional construction. An auxiliary combustion chamber 5 of a spherical shape is defined in the cylinder head 2, and is located above the main combustion chamber 1. The auxiliary combustion chamber 5 is formed in a block 2a which is tightly fitted in a bore 2b of the cylinder head 2. As shown, an ignition plug 6 and a fuel injection nozzle 7 are provided for the auxiliary combustion chamber 5. Both ignition plug 6 and fuel injection nozzle 7 are of conventional types. A passage 8 communicating the main combustion chamber 1 with the auxiliary combustion chamber 5 is provided at the lower portion of the block 2a. As shown in FIG. 2, the cross section of the passage 8 has a configuration of an elongated oval shape such as a form consisting of two semi-circles and two straight lines connecting them. The cross sectional area of the passage 8 should be 1 to 10% of that of the cylinder bore 3a, thereby minimizing the loss of flow velocity due to throttling or due to a reduced cross sectional area, as well as preventing a tendency for fuel 11 injected into the auxiliary combustion chamber 5 to be blown into the main combustion chamber 1 directly. The passage 8 should be inclined to such a degree that the combustion flame from the auxiliary combustion chamber 5 does not impinge strongly on the upper surface of the piston head 4 and that the combustion flame sufficiently spreads throughout the main combustion chamber 1 therein. In order to establishing the spread effect, the passage 8 is so formed as to permit the smooth spreading of the flame but at an angle $\alpha$ (no more than 45°) to the upper surface of the piston head 4 as well as to produce swirl flows of air within the auxiliary combustion chamber 5, when the air is introduced from the main combustion chamber 1. For insuring the aforesaid functions the configuration of the cross section of the passage 8 has to be an elongated oval shape formed by connecting two semicircles 12 and 13 with two straight lines 14 and 15, respectively, as shown in FIG. 2. The ratio $b/a$ of the length $b$ of a major axis to the length $a$ of a minor axis is preferably 1.5 to 3 and the area ratio of the passage 8 to the cross sectional area of the piston head 4 is 1 to 10%. Further, in order to easily produce the swirl within the axiliary combustion chamber, the passage 8, as shown in FIG. 1, extends tangentially to the auxiliary combustion chamber.

In operation, during the intake stroke, only air is introduced through an air intake port (not shown) into the main combustion chamber 1. Fuel is injected through the fuel injection nozzle 7 into the auxiliary combustion chamber 5 since just before or just after the intake valve (not shown) is closed until the compression stroke is finished. The fuel is injected into the auxiliary combustion chamber 5 as shown by the reference 11, while the piston is near the bottom dead point. The air taken into the main combustion chamber is introduced as an air flow 9 through the passage 8 into the auxiliary combustion chamber 5 to produce swirl flows 10 therein, when the piston 4 ascends in the compression stroke. The fuel 11 injected into the auxiliary combustion chamber is uniformly mixed with the introduced air due to the existence of the swirl flows 10. On the other hand, in the main combustion chamber 1, a lean mixture is produced by the blowing of part of injected fuel through the auxiliary combustion chamber 5 into the main combustion chamber 1. Thus the stratified charge of fuel-air mixture is achieved.

With such an arrangement, because of the cross sectional configuration of the passage 8 as aforesaid, the flame is blown from the combustion chamber 5 into the main combustion chamber 1 without being adversely affected by the throttling due to the reduced cross sectional area of the transfer passage 8. On the other hand, the flat envelope of the cross sectiona of the transfer passage 8 and the inclined angle thereof permit the rapid spreading of a flame throughout the entire main combustion chamber 1, while utilizing air prevailing within the main combustion chamber 1 for the secondary combustion, thus reducing the amount of unburnt hydrocarbons and carbon monoxide.

As shown in FIG. 1, the electrodes of the ignition plug 6 are exposed in the auxiliary combustion chamber 5 upstream of the swirl flow 10 shown by the arrow relative to the fuel injection nozzle 7. As a result of this arrangement of the ignition plug and the fuel injection nozzle, the electrodes of the ignition plug can not be wetted by the fuel injected from the nozzle 7 so that misfiring in the auxiliary combustion chamber 5 can be prevented.

Figure 3:
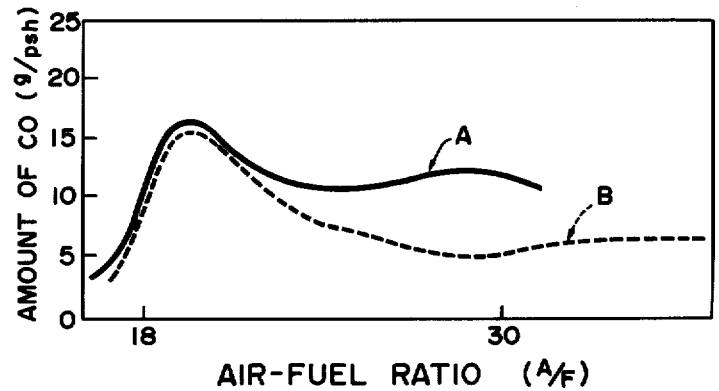
FIGS. 3 and 4 are diagrams which illustrate the relationship between the air-fuel ratio and the amount of the unburnt carbon monoxide and hydrocarbons, respectively, at varying inclined angles and cross sectional configurations of the passage.
Figure 4:
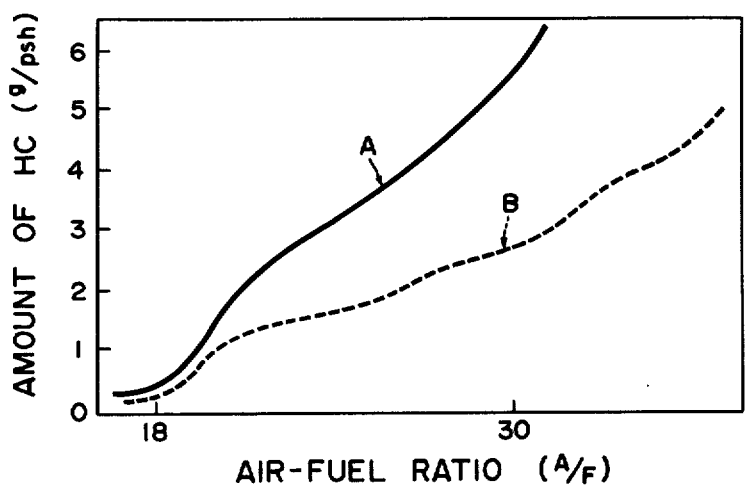

In FIGS. 3 and 4, a curve A refers to the case where the inclined angle $\alpha$ of the passage 8 is relatively large and the cross sectional configuration $b/a$ is relatively small, while a curve B refers to the case where the inclined angle $\alpha$ is relatively small and the cross sectional configuration $b/a$ is relatively large. As can be seen from the drawings, the latter case presents much reduced amounts of detrimental carbon monoxide and hydrocarbons contained in exhaust gases.

What is claimed is:

1. An internal combustion engine comprising:
   a cylinder block having a cylinder bore therein;
   a cylinder head secured to the cylinder block;
   a piston reciprocably disposed in the cylinder bore, said piston having a head with a flat upper surface;
   a main combustion chamber, to which only air is directly supplied, defined by the cylinder bore, said piston, and said cylinder head;

an auxiliary combustion chamber, circular in cross-section, defined in the cylinder head above the main combustion chamber;

an ignition plug having an electrode in said auxiliary combustion chamber;

a fuel injection nozzle in said auxiliary combustion chamber;

means defining a passage in the cylinder head for fluidly communicating the main combustion chamber and the auxiliary combustion chamber, said passage being disposed tangentially to the periphery of the auxiliary combustion chamber, extending at an angle of no more than 45° to the upper surface of the piston head, and having a cross-sectional area of 1 to 10% of the transverse cross-sectional area of the piston head, one end of said passage opening into said main combustion chamber and the other end thereof opening directly into one end of said auxiliary combustion chamber in a direction directly toward said ignition plug, said passage being in the form of a flat envelope in cross-section with flat sides and substantially semicircular ends and having a major axis, parallel to the upper surface of the piston head, and a minor axis within the ratio of 1.5 to 3 in length;

said fuel injection nozzle is positioned adjacent a portion of the auxiliary combustion chamber diametrically opposite said one end thereof; and said electrode is positioned between said passage and said fuel injection nozzle.

* * * * *